US009595881B2

(12) United States Patent
Ichihara

(10) Patent No.: US 9,595,881 B2
(45) Date of Patent: Mar. 14, 2017

(54) COMMON MODE NOISE REDUCTION APPARATUS

(71) Applicant: Masafumi Ichihara, Tokyo (JP)

(72) Inventor: Masafumi Ichihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 9 days.

(21) Appl. No.: 14/433,707

(22) PCT Filed: Oct. 25, 2012

(86) PCT No.: PCT/JP2012/077631
§ 371 (c)(1),
(2) Date: Apr. 6, 2015

(87) PCT Pub. No.: WO2014/064807
PCT Pub. Date: May 1, 2014

(65) Prior Publication Data
US 2015/0280602 A1     Oct. 1, 2015

(51) Int. Cl.
*H02M 1/12*     (2006.01)
*H02M 5/458*     (2006.01)

(52) U.S. Cl.
CPC ............ *H02M 5/458* (2013.01); *H02M 1/12* (2013.01); *H02M 1/126* (2013.01); *H02M 2001/123* (2013.01)

(58) Field of Classification Search
CPC .. H02M 1/12; H02M 2001/123; H02M 5/548; H02P 29/0038; H02P 2201/07

(Continued)

(56) References Cited

U.S. PATENT DOCUMENTS 4,667,173 A * 5/1987 Okochi .................. H02M 1/14
333/168
5,956,246 A * 9/1999 Sequeira ................ H02M 1/12
363/144

(Continued)

FOREIGN PATENT DOCUMENTS

JP     11-259687 A     9/1999
JP   2000-010409 A     1/2000

(Continued)

OTHER PUBLICATIONS

Japanese Office Action for JP Application No. 2013-512919.

(Continued)

*Primary Examiner* — Rajnikant Patel
(74) *Attorney, Agent, or Firm* — Sughrue Mion, PLLC; Richard C. Turner

(57) ABSTRACT

A common mode noise reduction apparatus includes a power converter that supplies electric power to a load; a housing that houses the power converter; a common mode inductor arranged between the power converter and the load; a power wire that passes through the common mode inductor and connects the power converter to the load; a grounding wire that passes through the common mode inductor and connects the housing and a bus of the power converter to ground potential on the load side; a first impedance element provided on the grounding wire between the load and the housing; and a second impedance element provided on the grounding wire between the bus of the power converter and the load.

12 Claims, 12 Drawing Sheets

(58) Field of Classification Search
USPC .. 363/40, 37, 39, 41, 46, 44, 80, 82, 89, 90; 327/552, 536
See application file for complete search history.

(56) References Cited

U.S. PATENT DOCUMENTS

| | | | | |
|---|---|---|---|---|
| 6,377,479 | B1 * | 4/2002 | Ayano | H02M 1/12 363/39 |
| 6,654,261 | B2 * | 11/2003 | Welches | H02M 1/126 363/131 |
| 6,781,802 | B2 * | 8/2004 | Kato | H02M 5/458 361/22 |
| 7,068,005 | B2 * | 6/2006 | Baker | H02M 1/126 318/611 |
| 8,324,980 | B2 * | 12/2012 | Schutten | H04B 3/30 333/12 |
| 2003/0161166 | A1 | 8/2003 | Mutoh | |

FOREIGN PATENT DOCUMENTS

| | | |
|---|---|---|
| JP | 2000-079252 A | 3/2000 |
| JP | 2001-268890 A | 9/2001 |
| JP | 2003-154095 A | 5/2003 |
| JP | 2003-348818 A | 12/2003 |
| JP | 2006-025467 A | 1/2006 |
| JP | 2007-274884 A | 10/2007 |
| JP | 2008-301555 A | 12/2008 |
| JP | 2011-019345 A | 1/2011 |

OTHER PUBLICATIONS

International Search Report for PCT/JP2012/077631 dated Jan. 29, 2013.
Communication dated Sep. 9, 2016, issued from the State Intellectual Property Office of People's Republic of China in counterpart Application No. 201280076654.1.

* cited by examiner

LOSS DUE TO IMPEDANCE SETTING

| IMPEDANCE SETTING | Z1 SMALL, Z2 LARGE | Z1 LARGE, Z2 SMALL |
|---|---|---|
| SAFETY | SAFE | PROBLEM IS PRESENT IN SAFETY |
| NOISE INFLUENCE ON PERIPHERY | LARGE | SMALL |
| COMMON MODE CURRENT INFLOW FROM POWER SUPPLY | SMALL | LARGE |

COMMON MODE NOISE REDUCTION APPARATUS

CROSS REFERENCE TO RELATED APPLICATIONS

This application is a National Stage of International Application No. PCT/JP2012/077631 filed Oct. 25, 2012, the contents of all of which are incorporated herein by reference in their entirety.

FIELD

The present invention relates to a common mode noise reduction apparatus.

BACKGROUND

Patent Literature 1 describes a power conversion apparatus in which a load wire connecting an inverter and a motor passes through the core; and a grounding wire for grounding the housing of the motor also passes through the core and is connected to a capacitor on the input side of the inverter. Consequently, according to Patent Literature 1, the resonance frequency of the resonance path in the inverter is reduced due to the impedance of the core; and a damping effect is obtained for the resonance path.

Patent Literature 2 describes a power conversion system in which a power line for connecting an inverter to a motor passes through the core of a PG coil; a common mode current reflux line, functioning as a path along which a common mode current flows back, passes through the core of the PG coil; and the power line and the common mode current reflux line arranged adjacent to each other. According to Patent Literature 2, the above means the direction of the common mode current flowing through the power line and the direction of the common mode current flowing through the common mode current reflux line are opposite. Therefore, the magnetic field generated by the common mode current flowing through the power line and the magnetic field generated by the common mode current flowing through the common mode current reflex line cancel each other out, and thus noise radiated from the power line can be reduced.

Patent Literature 3 describes a power conversion system in which a filter is provided between the power conversion apparatus; the load and a power line for connecting the power conversion apparatus to the load is simultaneously wound once around a first magnetic core and a second magnetic core; and a grounding wire, connecting the power conversion apparatus housing to the housing of the load, is wound once around the second magnetic core. Further, the winding direction of the grounding wire is set such that the magnetic field generated by the electric current in the power line and the magnetic field generated by the electric current in the grounding wire cancel each other. Thus, according to Patent Literature 3, a large current flows to the filter and a power line having a large sectional area can be wound in one winding process, which enables the manufacturing process and the size of the filter to be reduced.

CITATION LIST

Patent Literature

Patent Literature 1: Japanese Patent Application Laid-Open No. 2008-301555

Patent Literature 2: Japanese Patent Application Laid-Open No. 2001-268890

Patent Literature 3: Japanese Patent Application Laid-Open No. 2003-348818

SUMMARY

Technical Problem

In the technology described in Patent Literature 1, a capacitor that cuts off the current is provided on the grounding wire. However, because an object is to obtain a grounding action with sufficiently low impedance in a low-frequency region, the impedance value of the capacitor that cuts off the current is assumed to be extremely small.

This means that, in the technology described in Patent Literature 1, the impedance between the minus potential of a direct-current bus in the inverter on the grounding wire side and ground potential on the motor side is assumed to be extremely small. Therefore, any leakage current from the power supply side to the grounding wire tends to easily increase and an inflow of the common mode current from another apparatus to the grounding wire also tends to easily increase. When impedance between a main circuit in the inverter and the ground potential on the motor side is too low, the common mode current flowing into the grounding wire from the power supply side flows into the motor housing, which might give an operator an electric shock if the operator touches the motor housing, which is a safety problem that is likely to occur.

Patent Literature 2 describes that, in order to suppress a direct-current voltage applied to the PG coil and prevent characteristic deterioration of the PG coil, a capacitor is inserted along the common mode current reflux line. In the technology described in Patent Literature 2, the impedance of the common mode current reflux line needs to be sufficiently smaller than the impedance of a grounding circuit. Therefore, the impedance of the capacitor inserted on the common mode current reflux line is assumed to be extremely small.

In the technology described in Patent Literature 2, the impedance between the housing of the power conversion apparatus and the ground potential on the power supply side on the common mode current reflux line is assumed to be extremely small. Consequently, the common mode current flowing back from the motor side easily flows to the power supply side. The effect of noise exceeding an allowable level is likely to occur in peripheral apparatus connected to the same power supply system.

In the technology described in Patent Literature 3, a resistor having low impedance is connected to the grounding wire of the filter in series to prevent the magnetic material of the first and second magnetic cores from being saturated.

That is, in the technology described in Patent Literature 3, the impedance between the ground potential on the power supply side and the housing of the power conversion apparatus on the grounding wire is assumed to be extremely small. Therefore, the common mode current flowing back from the motor side tends to easily flow to the power supply side. Therefore, the effect of noise exceeding an allowable level is likely to occur in peripheral apparatus connected to the same power supply system.

The present invention has been made in view of the above and it is an objective of the present invention to provide a common mode noise reduction apparatus that can be safely operated and that can suppress the effect of noise on peripheral apparatus to a level that is equal to or lower than an allowable level.

Solution to Problem

To solve the problems and achieve the objectives described above, the present invention relates to a common mode noise reduction apparatus that includes the following: a power converter that supplies electric power to a load; a housing that houses the power converter; a common mode inductor arranged between the power converter and the load; a power wire that passes through the common mode inductor and connects the power converter to the load; a grounding wire that passes through the common mode inductor and connects the load to the housing and a bus of the power converter; a first impedance element provided on the grounding wire between the housing and the load; and a second impedance element provided on the grounding wire between the bus of the power converter and the load.

Advantageous Effects of Invention

According to the present invention, the power wire connects the power converter to the load while passing through the common mode inductor; and the grounding wire connects the load to the housing and the bus of the power converter while passing through the common mode inductor. Consequently, it is possible to feed back a common mode current, which is generated in the power converter and flows to the load, to the housing and power converter side while reducing the common mode current. The first impedance element is provided on the grounding wire between the load and the housing; and the second impedance element is provided on the grounding wire between the load and the bus in the power converter. Consequently, it is possible to properly balance the diversion of the common mode current flowing back from the load side to the housing side and to the bus side of the power converter. Therefore, it is possible to reduce the common mode voltage so that it is equal to or lower than an allowable upper limit and reduce the common mode current flowing away from the outside of the common mode noise reduction apparatus so that it is equal to or lower than an allowable upper limit level. As a result, it is possible to safely operate the common mode noise reduction apparatus because an electric shock experienced by an operator can be reduced if he/she touches the housing of the load. Further, it is possible to reduce the effect of noise on peripheral apparatus connected to the same power supply system such that noise is equal to or lower than an allowable level.

DESCRIPTION OF EMBODIMENTS

Embodiments of a common mode noise reduction apparatus according to the present invention are described in detail below with reference to the drawings. Note that the present invention is not limited to the embodiments.

First Embodiment

Figure 1:
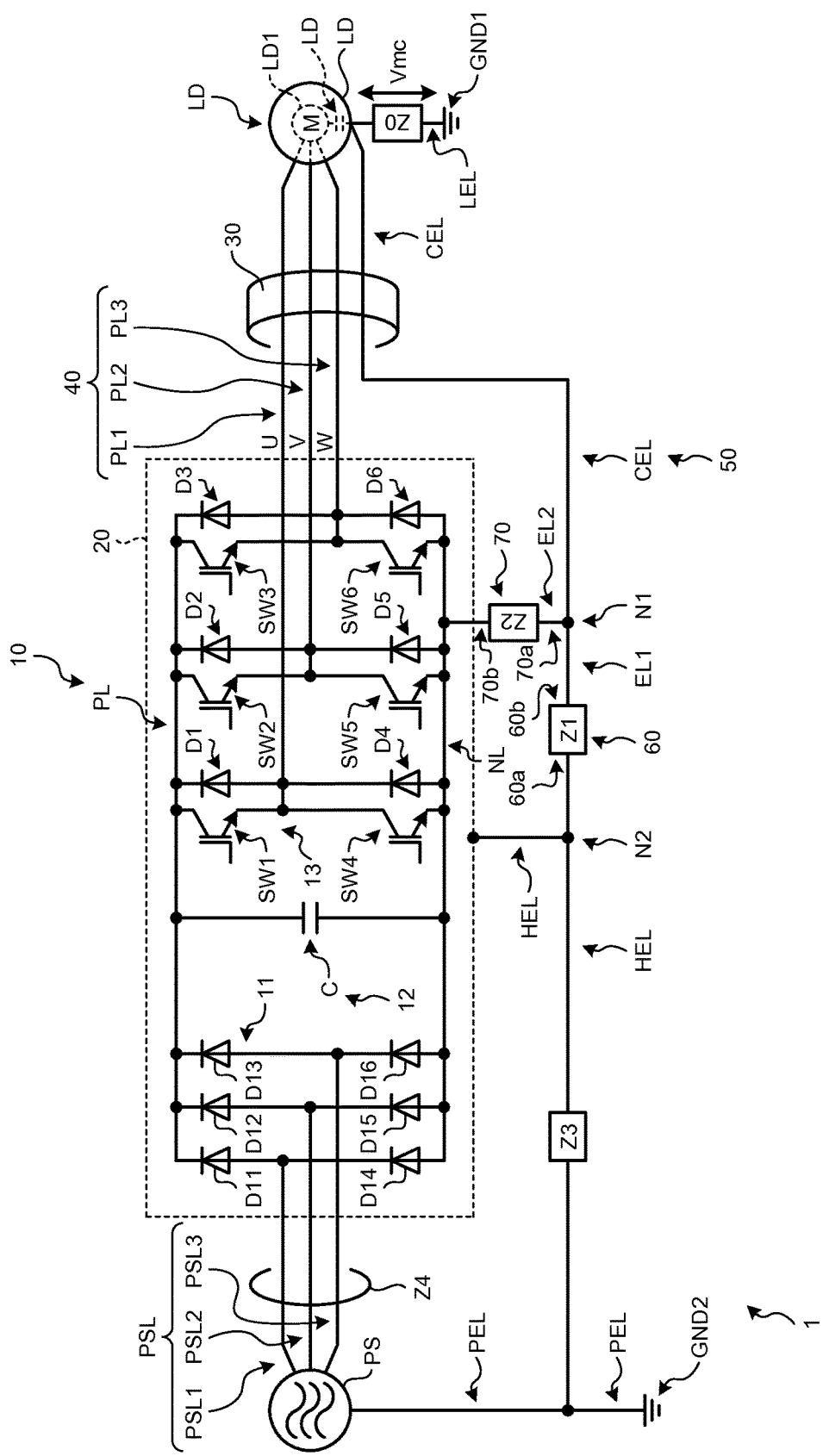
FIG. 1 is a diagram illustrating the configuration of a common mode noise reduction apparatus according to a first embodiment.

A common mode noise reduction apparatus 1 according to a first embodiment is described with reference to FIG. 1. FIG. 1 is diagram illustrating the configuration of the common mode noise reduction apparatus 1.

The common mode noise reduction apparatus 1 is an apparatus for reducing the common mode current (common mode noise) generated by and flowing from a power converter 10. The common mode noise reduction apparatus 1 includes a housing 20, a power converter 10, a common mode inductor 30, a power wire 40, a grounding wire 50, a first impedance element 60, and a second impedance element 70.

The housing 20 houses the power converter 10. The housing 20 protects the power converter 10 from mechanical shock or the like on the outside. The housing 20 is formed from a conductor such as metal.

The power converter 10 receives power (e.g., three-phase alternating-current power) from a power supply PS through a power supply wire PSL (power supply lines PSL1 to PSL3); performs power conversion by using the power to generate electric power (e.g., three-phase alternating-current power) to drive something; and supplies the electric power to drive something to a load LD through the power wire 40 (power lines PL1 to PL3). The load LD is, for example, a motor.

Specifically, the power converter 10 includes a converter 11, a smoothing section 12, and an inverter 13. The converter 11 converts power supply power (e.g., alternating-current power) into direct-current power. For example, the converter 11 includes a plurality of diodes D11 to D16 and rectifies the power supply power (e.g., alternating-current power) using the diodes D11 to D16. The material used for the diodes D11 to D16 can be a semiconductor such as Si or GaAs or a wide band gap semiconductor such as SiC, GaN, or diamond. The converter 11 supplies the rectified direct-current power to the smoothing section 12.

The smoothing section 12 receives the rectified direct-current power from the converter 11 and smoothes the direct-current power. For example, the smoothing section 12 includes a smoothing capacitor C and smoothes the direct-current power using the smoothing capacitor C. The smoothing section 12 supplies the smoothed direct-current power to the inverter 13.

The inverter 13 receives the smoothed direct-current power from the smoothing section 12 through a P-side bus PL and an N-side bus NL and converts the direct-current power into electric power (e.g., alternating-current power) to drive something. For example, the inverter 13 includes a plurality of switching elements SW1 to SW6 and a plurality of reflux diodes D1 to D6. The inverter 13 converts the direct-current power into electric power (e.g., alternating-current power) for driving something by causing the switching elements SW1 to SW6 to perform a switching operation at a predetermined timing. The materials used for the switching elements SW1 to SW6 and the reflux diodes D1 to D6 can be a semiconductor such as Si or GaAs or a wide band gap semiconductor such as SiC, GaN, or diamond. The inverter 13 supplies the electric power for driving something to the load LD through the power wire 40.

In the power converter 10, the switching operation of the switching elements SW1 to SW6 is performed, and a common mode current (common mode noise having a predetermined frequency) is generated and flows to the load LD side through the power wire 40. In the load LD, a load main body LD1, to which electric power is supplied, and a load housing LD3, which houses the load main body LD1, are equivalently connected via a parasitic stray capacitor LD2. To allow any charge accumulated in the load housing LD3 to escape to ground potential GND1, a load earth line LEL connecting the load housing LD3 to the ground potential GND1 is provided. Consequently, when a large common mode current flows into the load LD from the power converter 10, the inflowing common mode current is likely to flow out from the load main body LD1 to the ground potential GND1 through the stray capacitor LD2, the load housing LD3, and the load earth line LEL.

The load earth line LEL has a parasitic impedance value Z0. Therefore, when all the large common mode current flows to the load earth line LEL, a common mode voltage Vmc, which is the potential of the load hosing LD3 with respect to the ground potential GND1, is likely to rise and exceed an allowable upper limit value. If the common mode voltage Vmc rises and exceeds the allowable upper limit value, an operator is likely to get an electric shock if he/she touches the load housing LD3 and thus a problem concerning safety is likely to occur.

Therefore, the common mode inductor 30 is arranged between the power converter 10 and the load LD. The power wire 40 (the power lines PL1 to PL3) is configured to pass through a hole on the inner side of the common mode inductor 30. The common mode inductor 30 has, for example, an inductance value for selectively suppressing a frequency component corresponding to a common mode current in the electric current flowing via the power lines PL1 to PL3. The common mode inductor 30 has an annular shape (e.g., a rectangular annular shape, a ring shape, or an elliptical ring shape). The common mode inductor 30 is formed from a magnetic body such as ferrite.

The power wire 40 passes through the common mode inductor 30 and connects the power converter 10 to the load LD. The power wire 40 includes, for example, a plurality of power lines PL1 to PL3. The power line PL1 transmits, for example, U-phase alternating-current power from the power converter 10 to the load LD. The power line PL2 transmits, for example, a V-phase alternating-current power from the power converter 10 to the load LD. The power line PL3 transmits, for example, a W-phase alternating-current power from the power converter 10 to the load LD.

In this case, because the power lines PL1 to PL3 pass through the common mode inductor 30, a common mode current flowing via the power lines PL1 to PL3 can be reduced to some extent. However, it is still likely that the common mode current flowing into the load LD without being completely reduced flows out to the ground potential GND1 through the load earth line LEL. When all the common mode current not completely reduced flows to the load earth line LEL, the common mode voltage Vmc, which is the voltage of the load hosing LD3 with respect to the ground potential GND1, is likely to rise and exceed the allowable upper limit. When the common mode voltage Vmc exceeds the allowable upper limit value, the operator is likely to get an electric shock if he/she touches the load housing LD3, and thus a problem concerning safety can occur.

Therefore, the grounding wire 50 passes through the common mode inductor 30 and connects a bus (e.g., the N-side bus NL) of the housing 20 and the power converter 10 to the ground potential GND1 on the load LD side. That is, the grounding wire 50 is configured to feed back the common mode current, which flows into the load LD due to it not being completely suppressed, to the housing 20 and power converter 10 side via the grounding wire 50.

Specifically, the grounding wire 50 includes a common earth line CEL, a first earth line EL1, and a second earth line EL2. The common earth line CEL extends from the load LD side to a common node N1 that passes through the common mode inductor 30. The common earth line CEL passes through the common mode inductor 30 and electrically connects the ground potential GND1 on the load LD side to the common node N1. The common earth line CEL is connected to the ground potential GND1 on the load LD side via the load earth line LEL.

For example, the common earth line CEL connects the load housing LD3 and the common node N1. That is, the common earth line CEL is connected to the ground potential GND1 on the load LD side via the load housing LD3 and the load earth line LEL. Note that the common earth line CEL can be connected to a node on the load housing LD3 side on the load earth line LEL, or it can be connected to the ground potential GND1 on the load LD side via the load earth line LEL and not via the load housing LD3.

In this case, because the common earth line CEL passes through the common mode inductor 30, the common mode current flowing back via the common earth line CEL can be reduced to some extent. However, when the common mode current flowing back to the housing 20 and power converter 10 side without being fully suppressed flows out to only one of the housing 20 and the power converter 10, the common mode current is likely to cause a problem.

For example, when all the flowing-back common mode current flows out to the housing 20 side, i.e., from the power supply PS side through the housing earth line HEL and power supply earth line PEL, the common mode current is likely to have a noise effect (noise) exceeding an allowable level on other peripheral apparatus connected to a power supply system that is the same as the power supply PS.

Therefore, in the grounding wire 50, the common earth line CEL is connected to the first earth line EL1 and the second earth line EL2 via the common node N1. That is, the grounding wire 50 is configured to divert the common mode current fed back by the common earth line CEL to the first earth line EL1 and the second earth line EL2.

The first earth line EL1 extends from the common node N1 to the housing 20. The first earth line EL1 electrically connects the common node N1 and the housing 20. The first earth line EL1 is connected to ground potential GND2 on the power supply PS side via the housing earth line HEL and the power supply earth line PEL.

For example, the first earth line EL1 is connected to a node N2 on the housing 20 side in the housing earth line HEL. The housing earth line HEL connects the housing 20 to the power supply earth line PEL. In the housing earth line HEL, for example, a parasitic impedance value from the node N2 to a connection end of the power supply earth line PEL is Z3. The power supply earth line PEL connects the power supply PS to the ground potential GND2 to supply reference ground potential to the power supply PS.

The second earth line EL2 extends from the common node N1 to the bus (e.g., the N-side bus NL) of the power converter 10. The second earth line EL2 electrically connects the common node N1 and the bus (e.g., the N-side bus NL) of the power converter 10.

For example, the second earth line EL2 is connected to the N-side bus NL of the power converter 10. The N-side bus NL is connected to the power supply PS via a plurality of diodes D14 to D16 and the power supply wire PSL (the power supply lines PSL1 to PSL3).

The first impedance element 60 is provided between the housing 20 and the load LD on the grounding wire 50. For example, the first impedance element 60 is provided on the first earth line EL1. That is, one end 60a of the first impedance element 60 is connected to the node N2 and the other end 60b is connected to the common node N1. The first impedance element 60 has, for example, an impedance value Z1.

The second impedance element 70 is provided between the bus (e.g., the N-side bus NL) of the power converter 10 and the load LD on the grounding wire 50. For example, the second impedance element 70 is provided on the second earth line EL2. That is, one end 70a of the second impedance element 70 is connected to the common node N1 and the other 70b is connected to the N-side bus NL. The second impedance element 70 has, for example, an impedance value Z2.

As described above, in the common mode noise reduction apparatus 1, in a circuit configuration in which the power wire 40 and the grounding wire 50 between the power converter 10 and the load LD are inserted through the same common mode inductor 30, the earth line on the power converter 10 side is divided into two system (the first earth line EL1 and the second earth line EL2). One system (the first earth line EL1) is connected to the earth potential (the housing earth line HEL) on the power converter 10 side via the first impedance element 60. The other system (the second earth line EL2) is connected to the direct-current side potential (the N-side bus NL) via the second impedance element 70. The impedance values Z1 and Z2 corresponding to a common mode current to flow are given respectively to the first impedance element 60 and the second impedance element 70.

Figure 10:
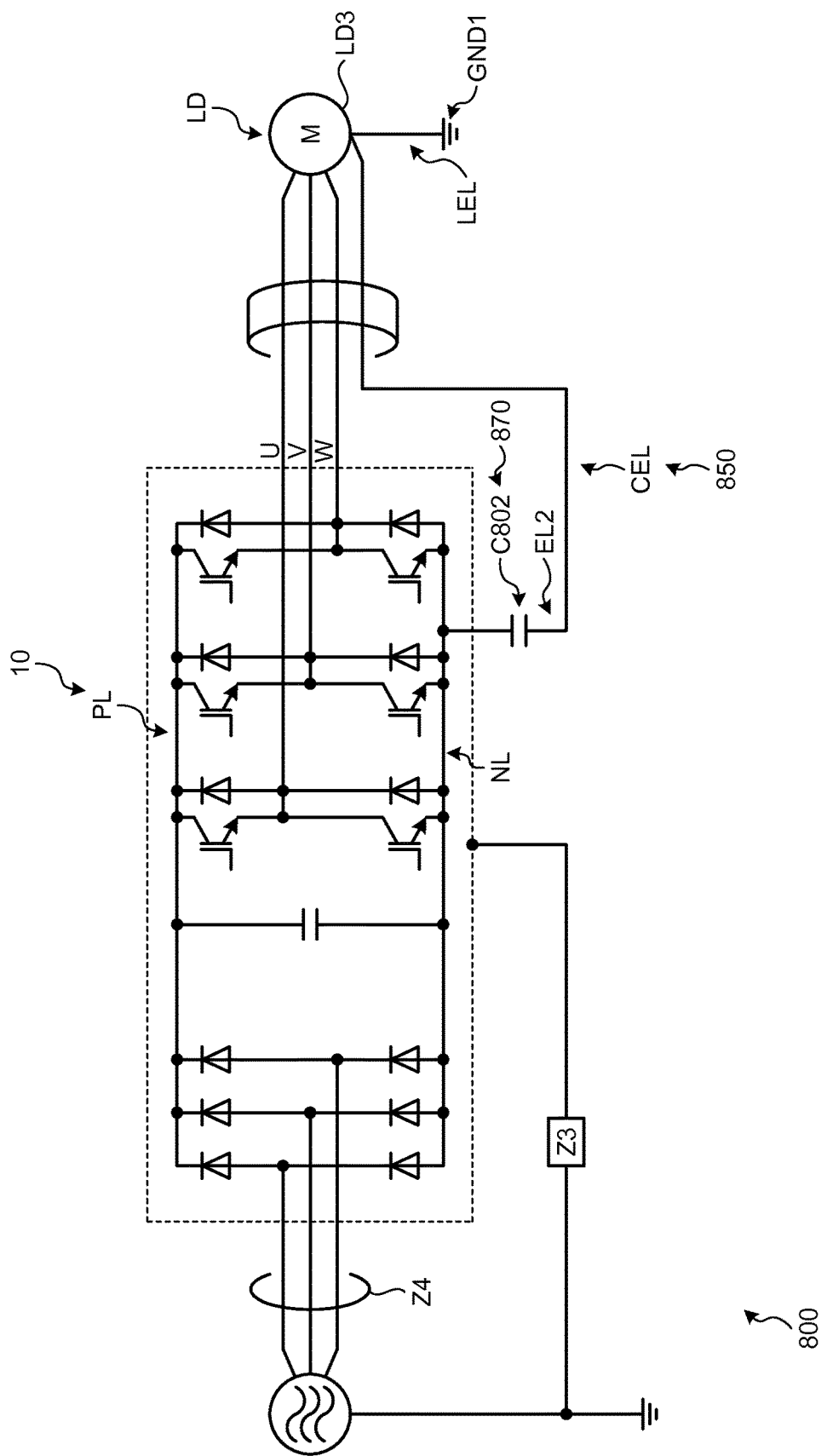
FIG. 10 is a diagram illustrating the configuration of common mode noise reduction apparatus according to a comparative example 1.

It is assumed that, as illustrated in FIG. 10 as a comparative example 1, in a common mode noise reduction apparatus 800, the first earth line EL1 and the first impedance element 60 (see FIG. 1) are not provided. In this case, to reduce the common mode voltage Vmc, which is the potential of the load housing LD3 with respect to the ground potential GND1, for example, it is considered desirable to configure a second impedance element 870 using a capacitor 802 that has a large capacity and to actively feedback a common mode current to the power converter 10 side, as indicated by the arrow at the head of the alternate long and short dash line in FIG. 11. This condition is equivalent to the configuration in FIG. 1 in which the impedance value Z2 of the second impedance element 70 is set small and the impedance value Z1 of the first impedance element 60 is set infinitely large.

Figure 11:
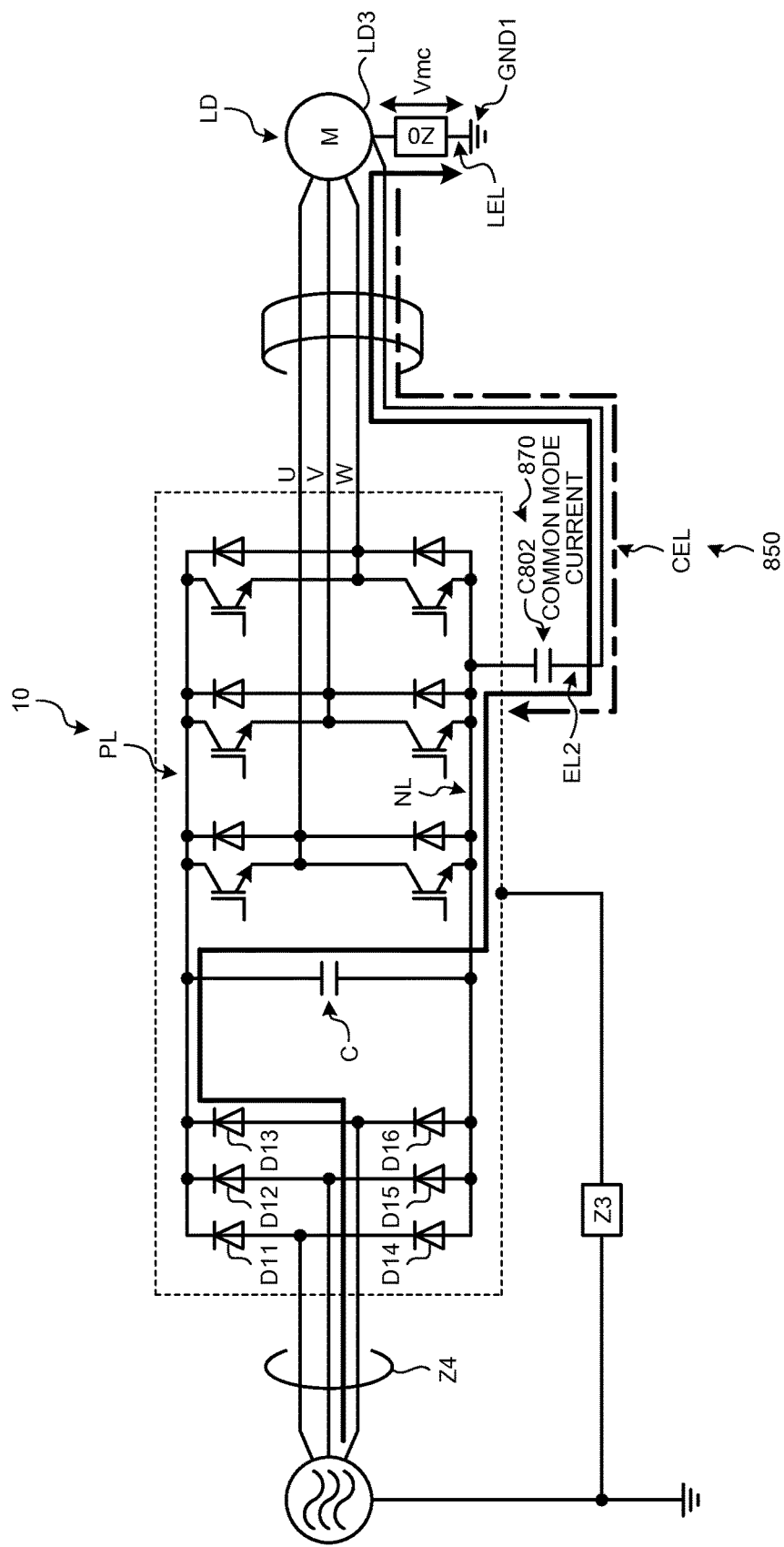
FIG. 11 is a diagram illustrating the operation of the common mode noise reduction apparatus according to the comparative example 1.

However, when the impedance value Z2 of the second impedance element 70 decreases, as indicated by the arrow at the head of the solid line in FIG. 11, a common mode current flowing into the power supply PS from another peripheral apparatus via the ground potential GND2 and the power supply earth line PEL is likely to flow into the grounding wire 50 from the power supply PS side through the diodes D11 to D16, the smoothing capacitor C, and the bus (e.g., the N-side bus NL) of the power converter 10. When the common mode current flowing into the grounding wire 50 flows out to the ground potential GND1 through the second earth line EL2, the common earth line CEL, and the load earth line LEL, the common mode voltage Vmc, which is the voltage of the load housing LD3 with respect to the ground potential GND1, is likely to rise and exceed the allowable upper limit value. When the common mode voltage Vmc rises and exceeds the allowable upper limit value, the operator is likely to get an electric shock if he/she touches the load housing LD3, and thus a problem concerning safety is likely to occur.

Figure 12:
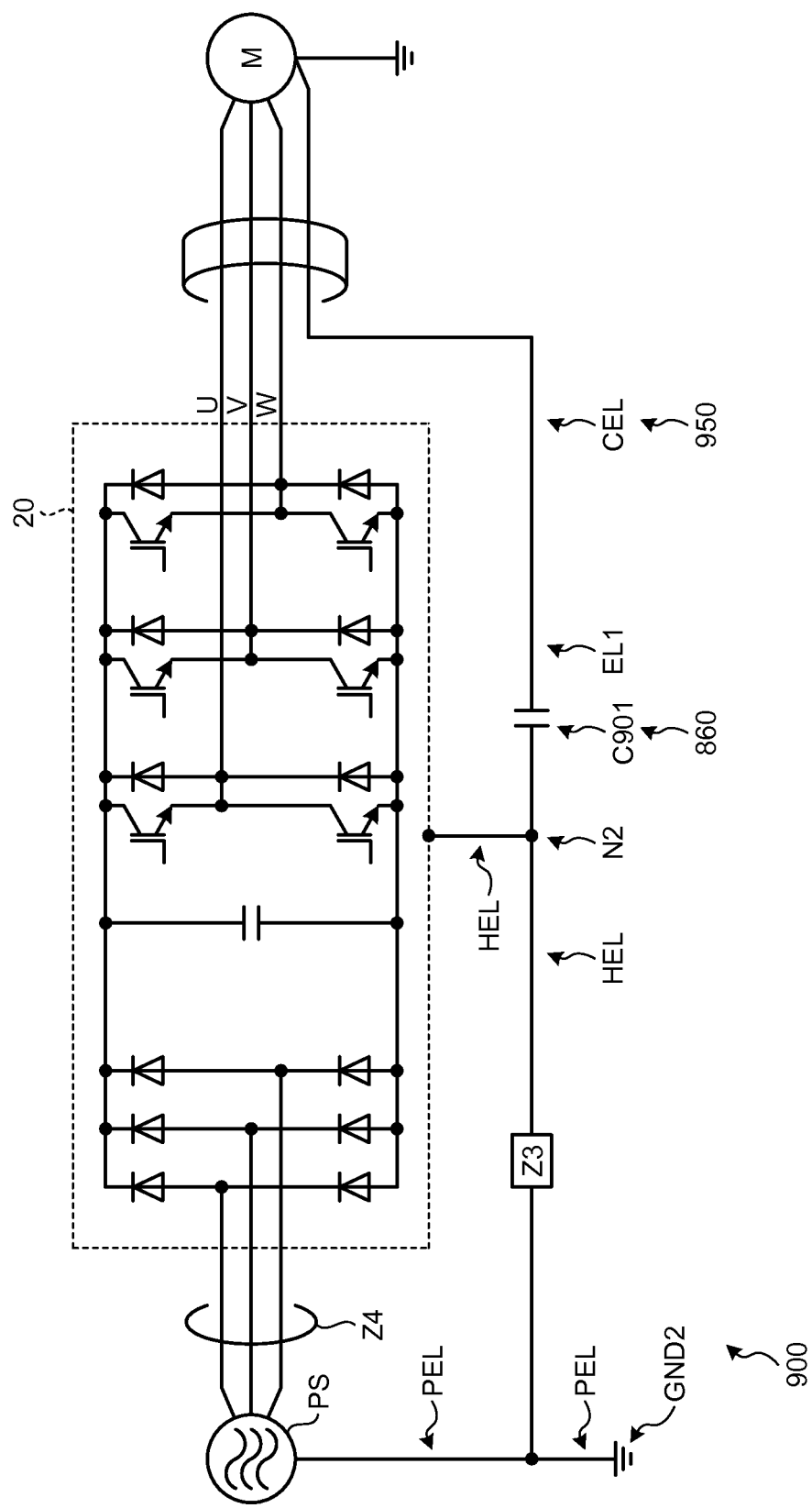
FIG. 12 is a diagram illustrating the configuration of a common mode noise reduction apparatus according to a comparative example 2.

Alternatively, it is assumed that, as illustrated in FIG. 12 as a comparative example 2, in a common mode noise reduction apparatus 900, the second earth line EL2 and the second impedance element 70 (see FIG. 1) are not provided. In this case, in order to reduce the common mode voltage Vmc, which is the potential of the load housing LD3 with respect to the ground potential GND1, it is considered desirable to configure a first impedance element 860 using a capacitor C901 having a large capacity and actively feed back a common mode current to the housing 20 side, as indicated by the arrow in the solid line in FIG. 13. This condition is equivalent to the configuration in FIG. 1 in which the impedance value Z1 of the first impedance element 60 is set small and the impedance value Z2 of the second impedance element 70 is set infinitely large.

Figure 13:
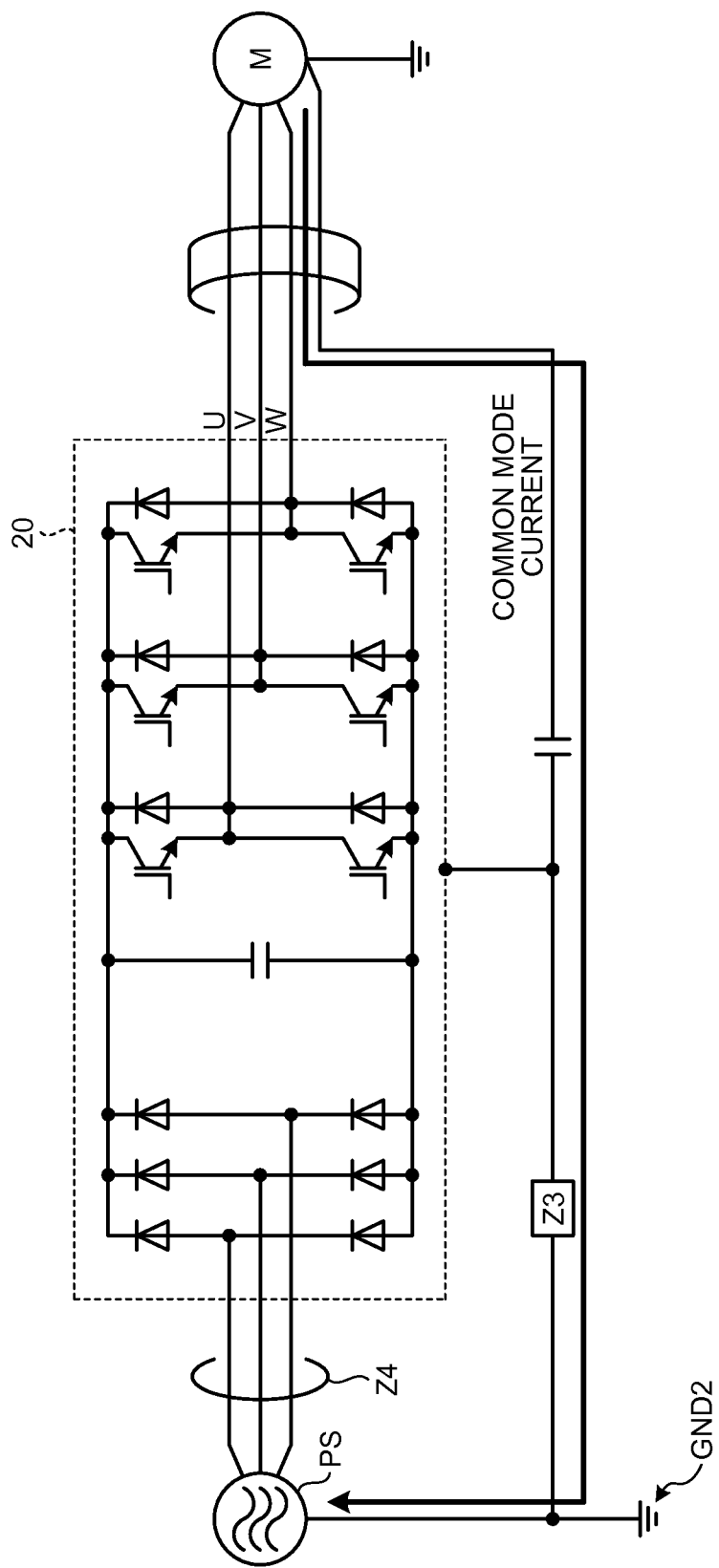
FIG. 13 is a diagram illustrating the operation of the common mode noise reduction apparatus according to the comparative example 2.

However, when the impedance value Z1 of the first impedance element 60 decreases, as indicated by the arrow at the head of a solid line in FIG. 13, all the flowing-back common mode current is likely to flow out to the housing 20 side, that is, the power supply PS side through the housing earth line HEL and the power supply earth line PEL. When all the flowing-back common mode current flows out to the power supply PS side, the common mode current is likely to have a noise effect (noise) exceeding an allowable level in the other peripheral apparatus connected to the same power supply system as the power supply PS. Further, when the common mode current flows through the housing earth line HEL, the parasitic impedance Z3, and the power supply earth line PEL, components diverted to the periphery of the apparatus increase, which may have a negative effect on the peripheral apparatus of the apparatus due to the noises.

Figure 4:
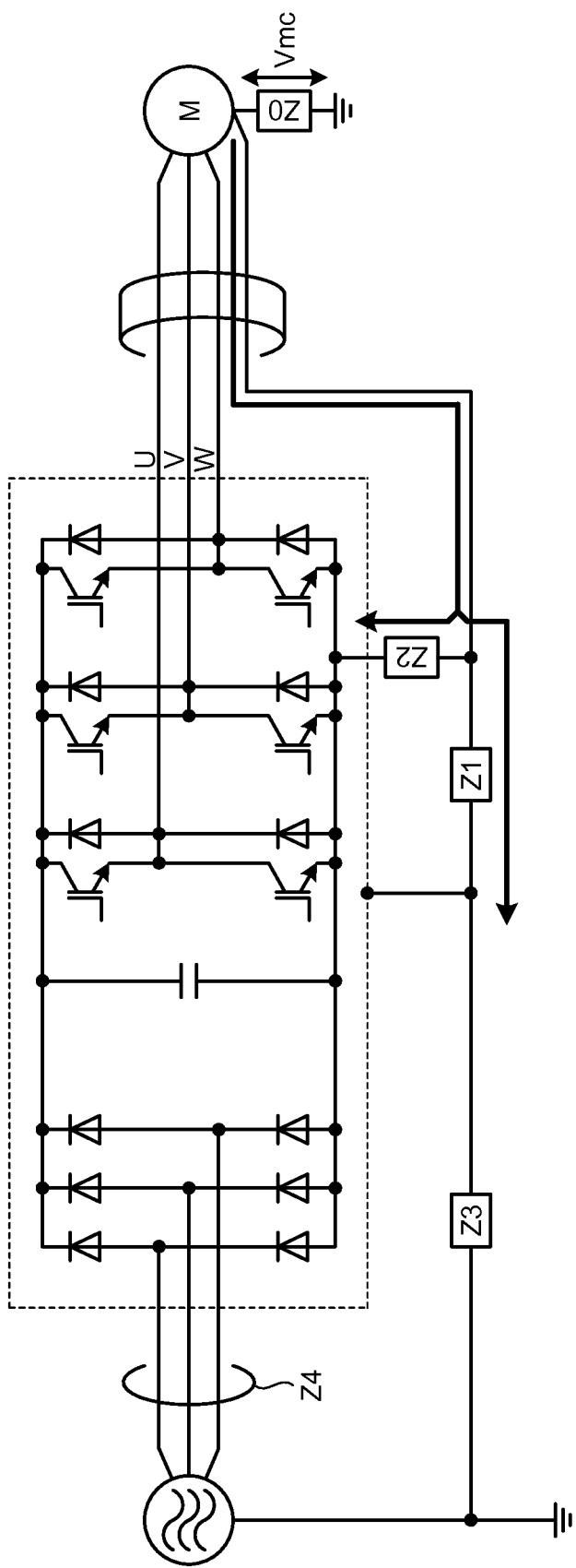
FIG. 4 is a diagram illustrating the operation of the common mode noise reduction apparatus in the first embodiment.

On the other hand, in the first embodiment, the first earth line EL1 and the second earth line EL2 are provided as a reflux path of a common mode current from the load LD side. The first impedance element 60 and the second impedance element 70 are provided respectively in the first earth line EL1 and the second earth line EL2. Consequently, it is possible to properly balance the diversion of the common mode current flowing back from the load LD side to the first earth line EL1 and the second earth line EL2 (see FIG. 4). For example, when the impedance value Z2 of the second impedance element 70 is reduced from the infinitely large value, because the impedance value Z2 cannot be reduced to be lower than a lower limit value Z2min (see FIG. 3), there occurs a component that cannot be completely absorbed by the second earth line EL2. This component can be fed to the power supply earth line PEL through the first earth line EL1 by adjusting the impedance value Z1 of the first impedance element 60 to a proper level.

That is, it is assumed that there is a proper range in which the impedance value Z1 of the first impedance element 60 and the impedance value Z2 of the second impedance element 70 are combined.

Figures 2, 3:
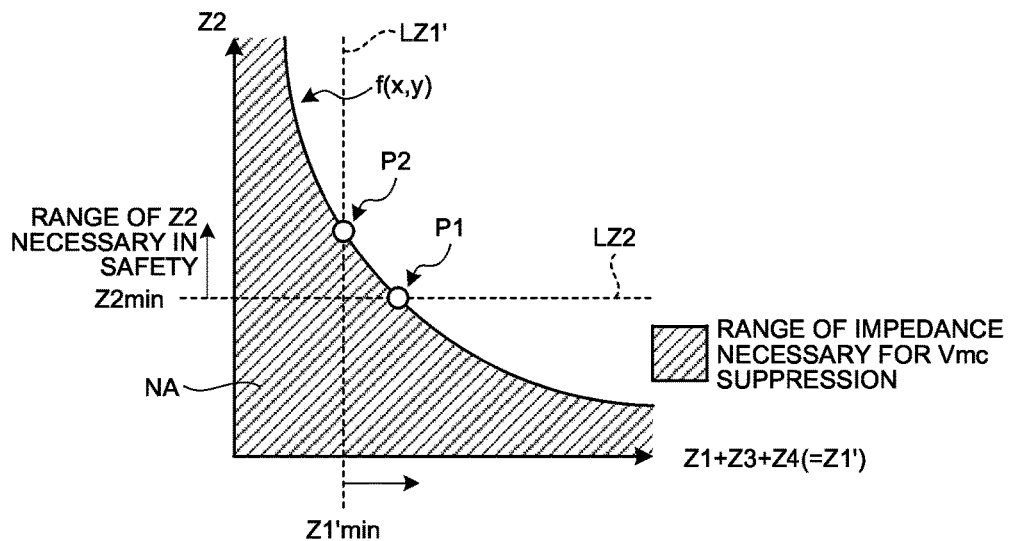
FIG. 2 is a diagram illustrating characteristics of the common mode noise reduction apparatus in the first embodiment.
FIG. 3 is a diagram illustrating characteristics of the common mode noise reduction apparatus in the first embodiment.

Therefore, first, the inventor assumed, on the basis of examination results of the comparative example 1 and the comparative example 2, the advantages and disadvantages due to the magnitudes of the impedance value Z1 of the first impedance element 60 and the impedance value Z2 of the second impedance element 70 were as illustrated in a table of FIG. 2.

Subsequently, the inventor examined, taking into account the advantages and the disadvantages illustrated in FIG. 2, a procedure for properly balancing the impedance value Z1 of the first impedance element 60 and the impedance value Z2 of the second impedance element 70.

This procedure is first examined with a value having the lower limit value Z2min (see FIG. 3) and, with safety taken into consideration, when the impedance value Z2 of the second impedance element 70 is reduced from the infinitely large value. That is, the impedance value Z2 of the second impedance element 70 is determined so as to satisfy a safety condition for specifying requirements for safety. The safety condition is represented by, for example, the following Formula 1:

$$Z2 \geq Z2min \quad \text{Formula 1}$$

The suppression ability of the common mode voltage Vmc, which is insufficient at the value of the impedance value Z2, is supplemented by reducing the impedance value Z1 of the first impedance element from the infinitely large value.

For example, in the configuration illustrated in FIG. 1, the common mode voltage Vmc is suppressed so as to be equal to or lower than the allowable upper limit value by balancing the impedance value Z1 of the first impedance element 60 and the impedance value Z2 of the second impedance element 70.

A common mode current, which flows to the first impedance element 60 of the impedance value Z1, flows to the power supply PS through the housing earth line HEL and the power supply earth line PEL, and thereafter it flows on a path returning to the power converter 10 through the power supply wire PSL (the power supply lines PSL1 to PSL3). The impedance value between the power supply earth line PEL and the housing 20 is substantially equal to the parasitic impedance value Z3 of the housing earth line HEL; and the common mode impedance from the power supply PS to the power converter 10 is substantially equal to a parasitic impedance value Z4 of the power supply wire PSL. In this case, as a result, the common mode current, which flows to the first impedance element 60 side of the impedance value Z1, also flows through the housing earth line HEL having the parasitic impedance value Z3 and the power supply wire PSL having the parasitic impedance value Z4. Therefore, an effect on the suppression of the common mode voltage Vmc changes in accordance with the impedance value of Z1+Z3+Z4.

From a necessary suppression width of the common mode voltage Vmc, a combination of the impedance value Z1+Z3+Z4 and the impedance value Z2 falls within the hatched portion NA on a (Z1+Z3+Z4)–Z2 plane illustrated in FIG. 3. In the case of a combination (Z1+Z3+Z4, Z2) in the upper right corner over the hatched portion NA illustrated in FIG. 3, combined impedance of the grounding wire 50 with respect to the common mode current is too large compared with the parasitic impedance value Z0 of the load earth line LEL. Therefore, it is difficult to feed back the common mode current, which flows into the load LD, to the housing 20 and power converter 10 side while passing the common mode current through the common mode inductor. Therefore, a necessary noise reduction effect tends to be not obtained thereby.

That is, under a condition in which the impedance value Z2 of the second impedance element 70 satisfies the safety condition (e.g., Formula 1), the impedance value of the first impedance element is determined so as to satisfy a noise condition for specifying requirements about a noise level that needs to be reduced. For example, when a function indicating a boundary of the noise condition is represented as f(x, y), the noise condition is represented by the following Formula 2 corresponding to the hatched portion NA illustrated in FIG. 3.

$$(Z1+Z3+Z4, Z2) \leq f(x, y) \quad \text{Formula 2}$$

Taking into considering that a target to be adjusted in the impedance value Z1+Z3+Z4 is mainly the impedance value Z1, the impedance value Z1+Z3+Z4 can be regarded as a parameter Z1' concerning the impedance value of the first impedance element. Therefore, when the impedance value Z1+Z3+Z4 is replaced with the parameter Z1', Formula 2 is converted into Formula 2'.

$$(Z1', Z2) \leq f(x, y) \quad \text{Formula 2'}$$

In a range in which the above two conditions (the safety condition and the noise condition) are satisfied (i.e., a region on a broken line LZ2 or above the broken line LZ2 in the hatched portion NA illustrated in FIG. 3), it is possible to suppress the common mode voltage Vmc. However, as the impedance value Z1+Z3+Z4 (=Z1') becomes smaller, the common mode current flowing into the power supply PS increases, so that the effect of noise on the other peripheral apparatus connected to the power supply system is the same as the power supply PS increases. Therefore, a lower limit value Z1'min (see FIG. 3) of the impedance value Z1+Z3+Z4 (=Z1') is examined, with taking into consideration of suppressing a common mode current flowing out to the outside to be equal to or lower than the allowable upper limit level, in a case where the impedance value Z1 of the first impedance element 60 is to be reduced from the infinitely large value.

That is, in a condition in which the impedance value Z2 of the second impedance element 70 satisfies the safety condition (e.g., Formula 1), the impedance value Z1 of the first impedance element 60 is determined so as to satisfy the noise condition (e.g., Formula 2 or Formula 2') and also so as to satisfy a current condition for specifying requirements concerning an allowable upper limit level of a common mode current flowing out to the outside. The current condition is represented by, for example, the following Formula 3:

$$Z1+Z3+Z4 \geq Z1'\text{min} \qquad \text{Formula 3}$$

When the impedance value Z1+Z3+Z4 is replaced with the parameter Z1', Formula 3 is becomes the following Formula 3':

$$Z1' \geq Z1'\text{min} \qquad \text{Formula 3'}$$

Therefore, a proper range is set as a range in which the above three conditions (the safety condition, the noise condition, and the current condition) are satisfied (i.e., a region on the broken line LZ2 or above the broken line LZ2 and on a broken line LZ1' or on the right of the broken line LZ1' in the hatched portion NA illustrated in FIG. 3).

In this proper range, when the suppression of the noise effect on the other peripheral apparatus is regarded as more important than the safety, it is desirable to set the impedance value Z1 as large as possible. As illustrated in FIG. 3, an intersection P1 of the function f(x, y) and the broken line LZ2 falls in a final selection point, as illustrated in FIG. 3.

Alternatively, when the safety is regarded as more important than the suppression of the noise influence on the other peripheral apparatus in this proper range, it is desirable to set the impedance value Z2 as large as possible. An intersection P2 of the function f(x, y) and the broken line LZ1' falls in a final selection point as illustrated in FIG. 3.

As described above, in the first embodiment, the power wire 40 connects the power converter 10 to the load LD and passes through the common mode inductor 30; the grounding wire 50 connects the load LD to the housing 20 and the bus (e.g., the N-side bus NL) of the power converter 10 and passes through the common mode inductor 30. Consequently, it is possible to feed back the common mode current, which is generated in the power converter 10 and flows to the load LD, to the housing 20 and power converter 10 side, while suppressing the common mode current. The first impedance element 60 is provided between the housing 20 and the load LD on the grounding wire 50; and the second impedance element 70 is provided between the bus of the power converter 10 and the load LD on the grounding wire 50. Consequently, it is possible to properly balance the diversion of the common mode current flowing back from the load LD side to the housing 20 side and the bus side of the power converter 10. Therefore, it is possible to suppress the common mode voltage Vmc so that it is equal to or lower than the allowable upper limit and suppress the common mode out-flowing current from the common mode noise reduction apparatus 1 so that it is equal to or lower than the allowable upper limit level. As a result, it is possible to safely operate the common mode noise reduction apparatus 1 because an electric shock if he/she touches the load housing LD3 can be reduced. Further, it is possible to suppress the effect of noise on the peripheral apparatus connected to the same power supply system so that it is equal to or lower than the allowable level.

In the first embodiment, in the grounding wire 50, the common earth line CEL connects the load LD to the common node N1 and passes through the common mode inductor 30; the first earth line EL1 connects the common node N1 to the housing 20; and the second earth line EL2 connects the common node N1 to the bus (e.g., the N-side bus NL) of the power converter 10. The first impedance element 60 is provided on the first earth line EL1; and the second impedance element 70 is provided on the second earth line EL2. Consequently, it is possible to properly balance the diversion of the common mode current flowing back from the load LD side to the first earth line EL1 and the second earth line EL2.

In the first embodiment, the common earth line CEL is connected to, for example, the load housing LD3. Consequently, it is easy to feed back the common mode current, which flows into the load housing LD3 from the power converter 10 through the load main body LD1 and the stray capacitor LD3, to the grounding wire 50 while preventing the common mode current from flowing into the load earth line LEL.

In the first embodiment, the first earth line EL1 is connected to the power supply PS via the housing earth line HEL and the power supply earth line PEL. Consequently, it is possible to feed back the common mode current, which is diverted to the first earth line EL1, to the power converter 10 side from the power supply PS side.

In the first embodiment, the impedance value Z1 of the first impedance element 60 and the impedance value Z2 of the second impedance element 70 are balanced taking into account the safety and the noise level that need to be reduced. Consequently, it is possible to divert the common mode current flowing back from the load LD side to the housing 20 side and the bus side of the power converter 10, taking into account the safety and the noise level that needs to be reduced.

In the first embodiment, the impedance value Z2 of the second impedance element 70 is determined so as to satisfy the safety condition specifying the requirements concerning the safety. Under the condition in which the impedance value Z2 of the second impedance element 70 satisfies the safety condition, the impedance value Z1 of the first impedance element 60 is determined so as to satisfy the noise condition for specifying the requirements concerning the noise level that needs to be reduced. Consequently, it is possible to balance the impedance value Z1 of the first impedance element 60 and the impedance value Z2 of the second impedance element 70 taking into account the safety and the noise level that needs to be reduced.

In the first embodiment, under the condition in which the impedance value Z2 of the second impedance element 70 satisfies the safety condition, the impedance value Z1 of the first impedance element 60 is determined so as to satisfy the noise condition for specifying the requirements concerning the noise level that needs to be reduced; and so as to satisfy the current condition for specifying the requirements concerning the allowable upper limit level of the common mode current that is out flowing. Consequently, it is possible to balance the impedance value Z1 of the first impedance element 60 and the impedance value Z2 of the second impedance element 70 furthermore by taking into account the safety and the noise level that needs to be reduced.

In the first embodiment, the common mode noise reduction apparatus 1 simultaneously satisfies Formula 1' and Formula 2', above. Consequently, it is possible to determine the impedance value Z2 of the second impedance element 70 so as to satisfy the safety condition. Further, under the condition in which the impedance value Z2 of the second impedance element 70 satisfies the safety condition, it is possible to determine the impedance value Z1 of the first impedance element 60 so as to satisfy the noise condition.

In the first embodiment, the common mode noise reduction apparatus 1 simultaneously satisfies Formula 1', Formula 2', and Formula 3', above. Consequently, it is possible to determine the impedance value Z2 of the second impedance element 70 so as to satisfy the safety condition. Further, under the condition in which the impedance value Z2 of the second impedance element 70 satisfies the safety condition, it is possible to determine the impedance value Z1 of the first impedance element 60 so as to satisfy both the noise condition and the current condition.

Figure 5:
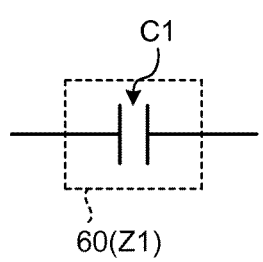
FIGS. 5 (a)-(f) is a diagram illustrating the configuration of a first impedance element in a modification of the first embodiment.
Figure 5:
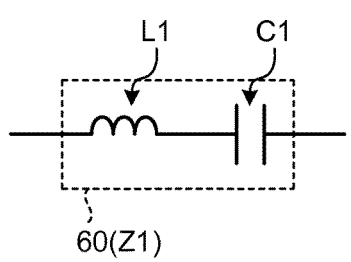
Figure 5:
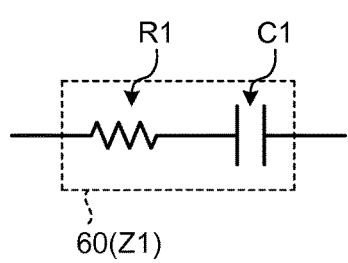
Figure 5:
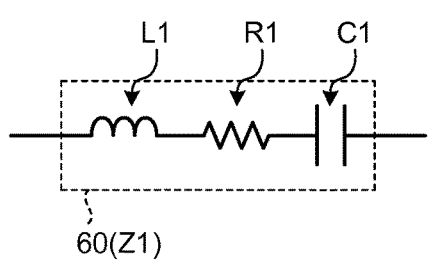
Figure 5:
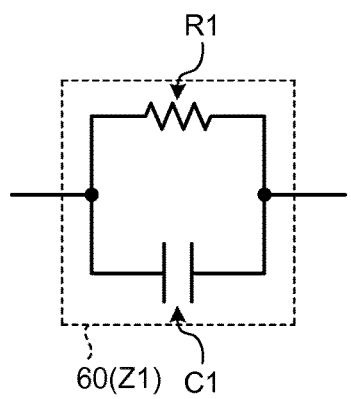
Figure 5:
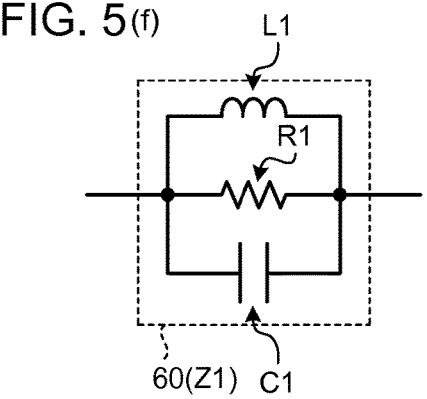

Note that, for example, as illustrated in FIG. 5A, the first impedance element 60 can include a capacitor C1. Alternatively, for example, as illustrated in FIG. 5B, the first impedance element 60 can include a resistor R1 and the capacitor C1 connected to each other in series. Alternatively, for example, as illustrated in FIG. 5C, the first impedance element 60 can include the resistor R1 and the capacitor C1 connected to each other in parallel. Alternatively, for example, as illustrated in FIG. 5D, the first impedance element 60 can include a coil L1 and the capacitor C1 connected to each other in series. Alternatively, for example, as illustrated in FIG. 5E, the first impedance element 60 can include the coil L1, the resistor R1, and the capacitor C1 connected to one another in series. Alternatively, for example, as illustrated in FIG. 5F, the first impedance element 60 can include the coil L1, the resistor R1, and the capacitor C1 connected to one another in parallel. In all the cases from FIG. 5A to FIG. 5F, it is possible to determine the impedance value of the first impedance element 60 as Z1.

When the first impedance element 60 includes the capacitor C1 as illustrated in FIG. 5A to FIG. 5F, it is possible to separate the ground potential GND1 on the load side LD and the ground potential GND2 on the power supply PS side as direct current, which can separately be grounded on the load LD side and on the power supply PS side.

When the first impedance element 60 includes the resistor R1 as illustrated in FIG. 5B, FIG. 5C, FIG. 5E, and FIG. 5F, it is possible to increase damping; and to suppress oscillation of the fed-back common mode current.

When the first impedance element 60 includes the coil L1 as illustrated in FIG. 5D to FIG. 5F, it is possible to reduce the peak value of the fed-back common mode current to a low loss (e.g., no loss).

Figure 6:
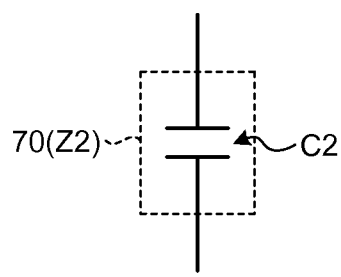
FIGS. 6 (a)-(c) is a diagram illustrating the configuration of the second impedance element in the modification of the first embodiment.
Figure 6:
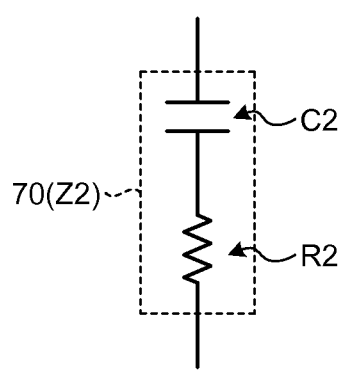
Figure 6:
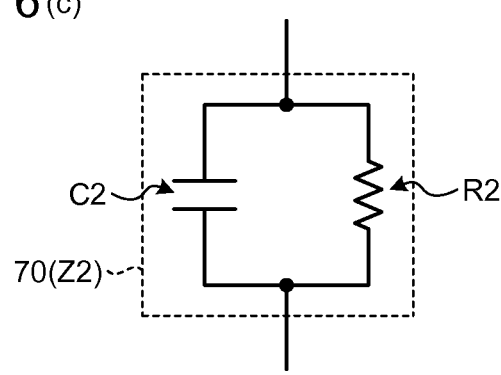

For example, as illustrated in FIG. 6A, the second impedance element 70 can include a capacitor C2. Alternatively, for example, as illustrated in FIG. 6B, the second impedance element 70 can include a resistor R2 and the capacitor C2 connected to each other in series. Alternatively, for example, as illustrated in FIG. 6C, the second impedance element 70 can include the resistor R2 and the capacitor C2 connected to each other in parallel. In all the cases illustrated in FIGS. 6A to 6C, it is possible determine the impedance value of the second impedance element 70 as Z2.

When the second impedance element 70 includes the capacitor C2 as illustrated in FIGS. 6A to FIG. 6C, it is possible to separate the ground potential GND1 on the load LD side and the bus (e.g., the N-side bus NL) of the power converter 10 as direct current.

When the second impedance element 70 includes the resistor R2 as illustrated in FIGS. 6B to FIG. 6C, it is possible to increase damping and suppress oscillation of the fed-back common mode current.

A specific form of the first impedance element 60 illustrated in FIG. 5D to FIG. 5F and a specific form of the second impedance element 70 illustrated in FIG. 6B to FIG. 6C can be arbitrarily combined.

Figure 7:
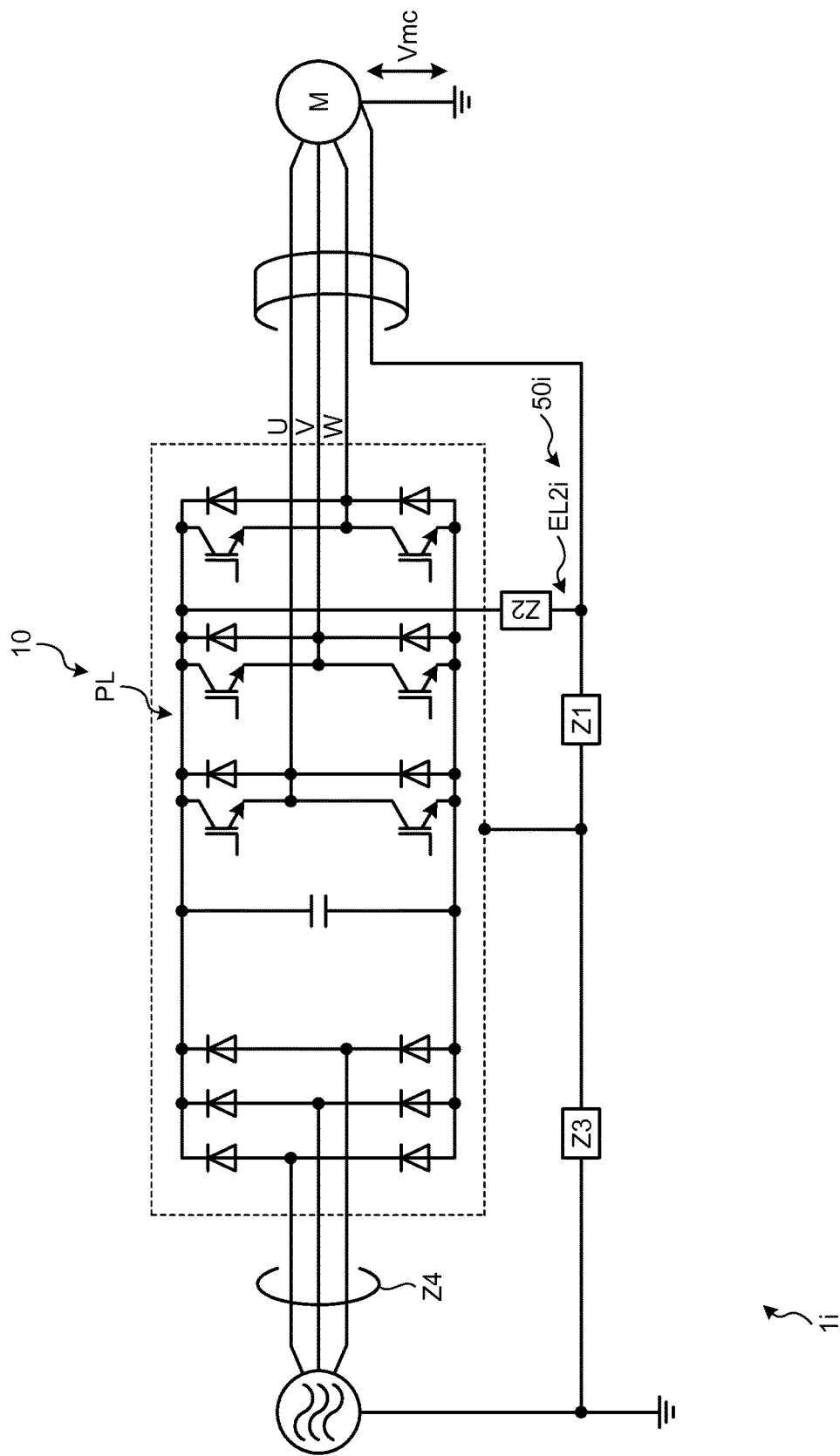
FIG. 7 is a diagram illustrating the configuration of common mode noise reduction apparatus according to another modification of the first embodiment.

Alternatively, as illustrated in FIG. 7, in a common mode noise reduction apparatus 1i, a second earth line EL2i in a grounding wire 50i can be connected to the P-side bus PL of the power converter 10. In this case, same effects as derived from the first embodiment can be realized.

Figure 8:
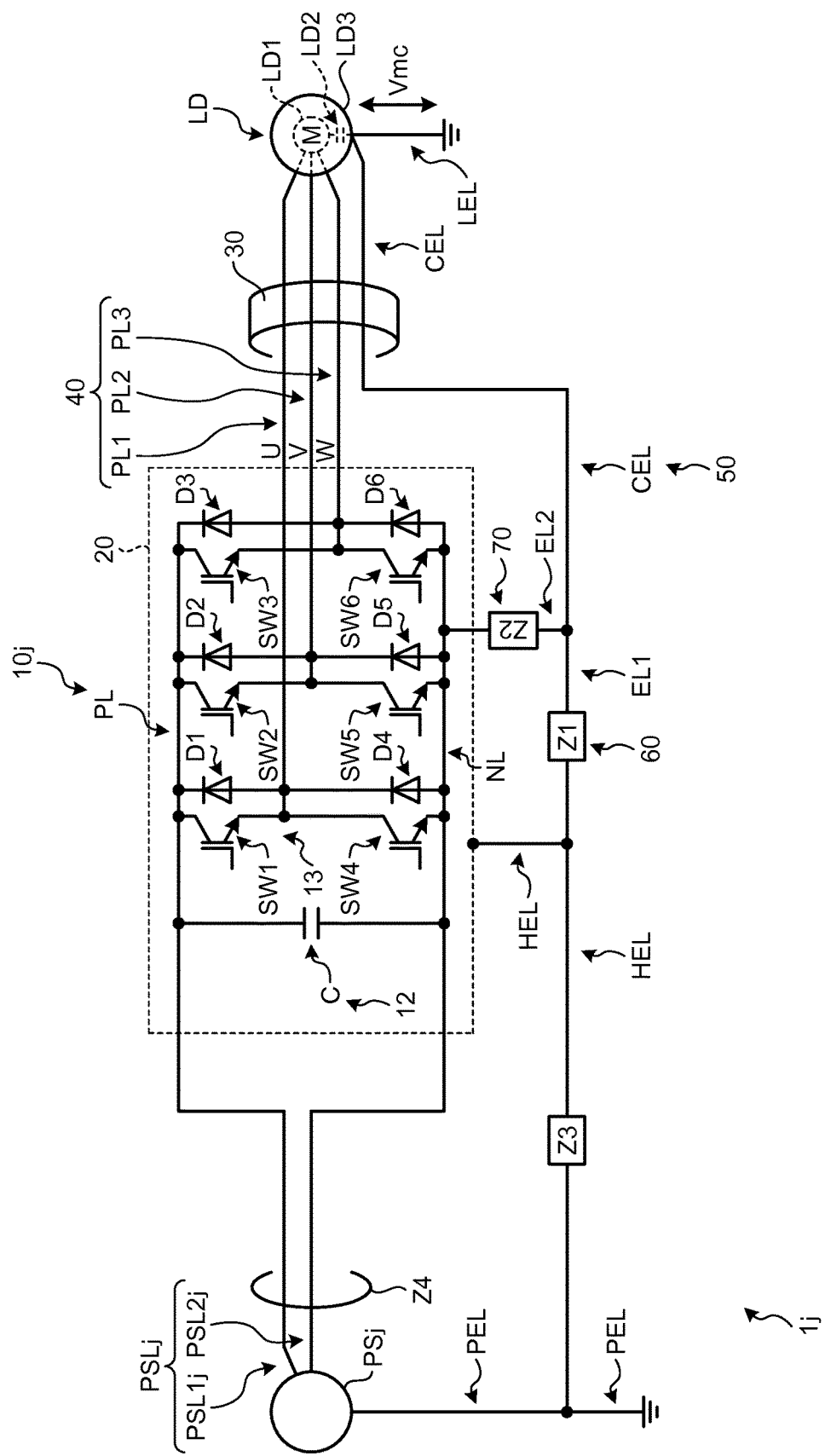
FIG. 8 is a diagram illustrating the configuration of common mode noise reduction apparatus according to another modification of the first embodiment.

Alternatively, as illustrated in FIG. 8, in a common mode noise reduction apparatus 1j, a power converter 10j does not have to include the converter 11 (see FIG. 1). In this case, the power converter 10j receives direct-current power supply power from a power supply PSj through a power supply wire PSLj (power supply lines PSL1j and PSL2j) and performs power conversion by using a direct-current power supply power. In this case, the same effects as those derived from the first embodiment can be realized.

Second Embodiment

Figure 9:
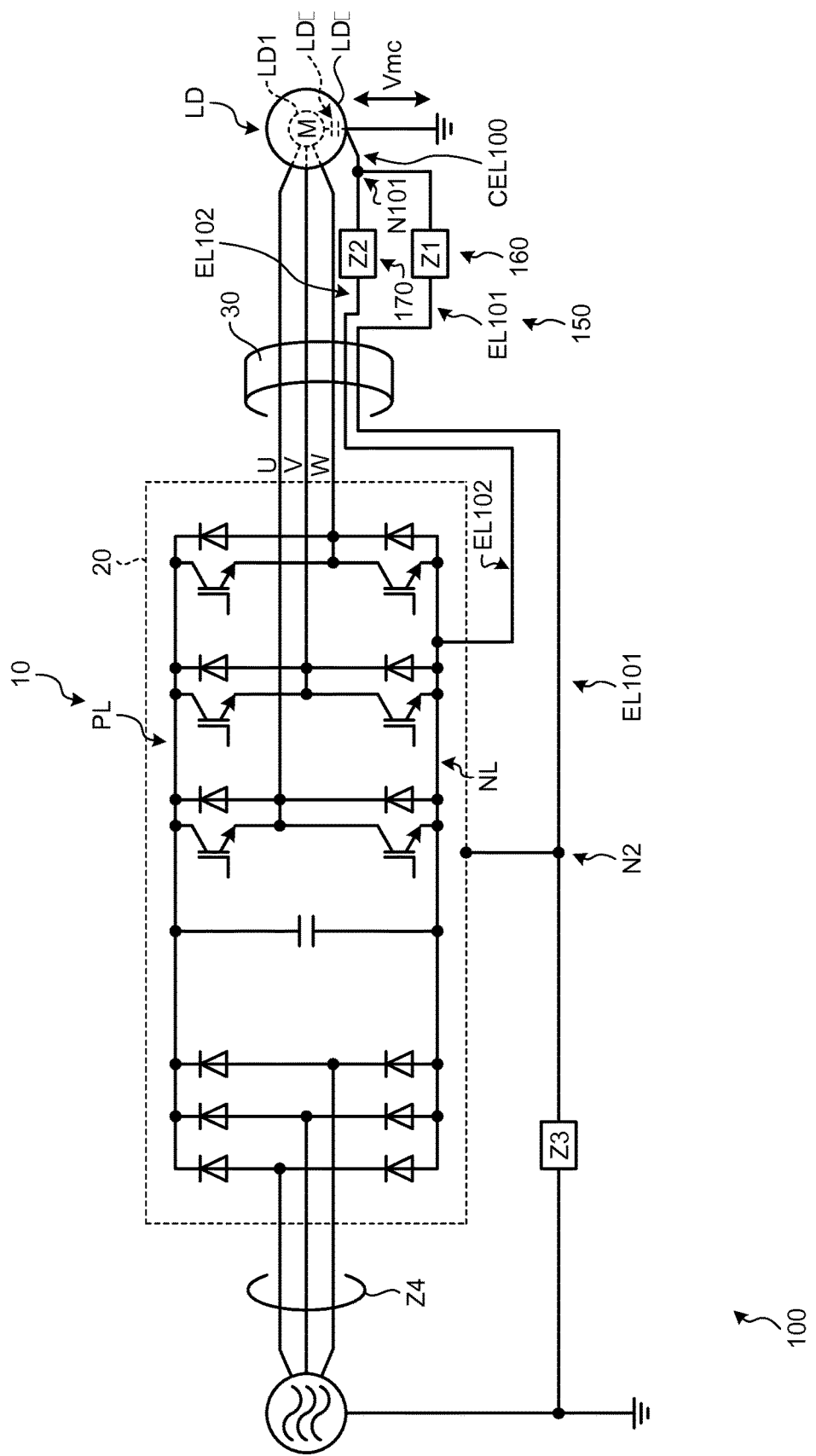
FIG. 9 is a diagram illustrating the configuration of common mode noise reduction apparatus according to a second embodiment.

A common mode noise reduction apparatus 100 according to a second embodiment is described with reference to FIG. 9. FIG. 9 is a diagram illustrating the configuration of the common mode noise reduction apparatus 100.

In the first embodiment, the common mode current flowing back in the grounding wire 50 is diverted after passing through the common mode inductor 30. In the second embodiment, the common mode current flowing back in the grounding wire 150 passes through the common mode inductor 30 after it has been diverted.

Specifically, as illustrated in FIG. 9, the common mode noise reduction apparatus 100 includes a grounding wire 150, a first impedance element 160, and a second impedance element 170 instead of the grounding wire 50, the first impedance element 60, and the second impedance element 70.

The grounding wire 150 includes a common earth line CEL 100, a third earth line EL 101, and a fourth earth line EL 102. The common earth line CEL 100 connects the load LD to the common node N101. For example, the common earth line CEL 100 is connected to the load housing LD3 and connects the load housing LD3 to the common node N101.

The third earth line EL 101 extends from the common node N101 to the housing 20 passing through the common mode inductor 30. That is, the third earth line EL 101 connects the common node N101 to the housing 20 while passing through the common mode inductor 30. For example, the third earth line EL 101 is connected to the node N2 on the housing 20 side in the housing earth line HEL.

The fourth earth line EL 102 extends to the bus (e.g., the N-side bus NL) of the power converter 10 from the common node N101 and passes through the common mode inductor 30. That is, the fourth earth line EL 102 connects the common node N101 to the bus (e.g., the N-side bus NL) of the power converter 10 while passing through the common mode inductor 30. For example, the fourth earth line EL 102 is connected to the N-side bus NL of the power converter 10.

The first impedance element 160 is provided on the third earth line EL 101. For example, the first impedance element 160 is provided between the common node N101 and the common mode inductor 30 on the third earth line EL 101. The first impedance element 160 has, for example, the impedance value Z1 as in the first embodiment.

The second impedance element 170 is provided on the fourth earth line EL 102. For example, the second impedance element 170 is provided between the common node N101 and the common mode inductor 30 on the fourth earth line EL 102. The second impedance element 170 has, for example, the impedance value Z2 as in the second embodiment.

As described above, in the second embodiment, the common earth line CEL 100 connects the load LD to the common node N101; the third earth line EL 101 connects the common node N101 to the housing 20 while passing through the common mode inductor 30; and the fourth earth line EL 102 connects the common node N101 to the bus of the power converter 10 while passing through the common mode inductor 30. The first impedance element 160 is provided between the common mode inductor 30 and the common node N101 on the third earth line EL 101; and the second impedance element 170 is provided between the common mode inductor 30 and the common node N101 on the fourth earth line EL 102. Consequently, the common mode current flowing back from the load LD side passes through the common mode inductor 30 after being diverted to the third earth line EL 101 and the fourth earth line EL 102 so that it is possible to efficiently suppress the common mode current with the common mode inductor 30.

INDUSTRIAL APPLICABILITY

As described above, the common mode noise reduction apparatus according to the present invention is useful for reducing common mode noise.

REFERENCE SIGNS LIST 1, 1i, 1j, 100, 800, 900 Common mode noise reduction apparatuses
10, 10j Power converters
11 Converter
12 Smoothing section
13 Inverter
20 Housing
30 Common mode inductor
40 Power wire
50, 50i, 150 Grounding wires
60, 160 First impedance elements
70, 170 Second impedance elements
CEL, CEL 100 Common earth lines
EL1 First earth line
EL2, EL2i Second earth lines
EL 101 Third earth line
EL 102 Fourth earth line
HEL Housing earth line
N1, N101 Common nodes
PEL Power supply earth line
PS, PSj Power supplies The inventiom claimed is:

1. A common mode noise reduction apparatus comprising:
a power converter that supplies electric power to a load;
a housing that houses the power converter;
a common mode inductor arranged between the power converter and the load;
a power wire that passes through the common mode inductor and connects the power converter to the load;
a grounding wire that passes through the common mode inductor and connects the load to the housing and a bus of the power converter;
a first impedance element provided on the grounding wire between the housing and the load; and
a second impedance element provided on the grounding wire between the bus of the power converter and the load.

2. The common mode noise reduction apparatus according to claim 1, wherein
the grounding wire includes:
a common earth line that passes through the common mode inductor and connects the load to a common node;
a first earth line that connects the common node to the housing; and
a second earth line that connects the common node to the bus of the power converter,
the first impedance element is provided on the first earth line, and
the second impedance element is provided on the second earth line.

3. The common mode noise reduction apparatus according to claim 2, wherein
the common earth line is connected to a housing of the load.

4. The common mode noise reduction apparatus according to claim 2, wherein
the first earth line is connected to a power supply via a housing earth line and a power supply earth line.

5. The common mode noise reduction apparatus according to claim 1, wherein
the grounding wire includes:
a common earth line that connects the load to a common node;
a third earth line that passes through the common mode inductor and connects the common node to the housing; and
a fourth earth line that passes through the common mode inductor and connects the common node to the bus of the power converter,
the first impedance element is provided on the third earth line between the common node and the common mode inductor, and
the second impedance element is provided on the fourth earth line between the common node and the common mode inductor on the fourth earth line.

6. The common mode noise reduction apparatus according to claim 5, wherein
the common earth line is connected to a housing of the load.

7. The common mode noise reduction apparatus according to claim 5, wherein
the first earth line is connected to a power supply via a housing earth line and a power supply earth line.

8. The common mode noise reduction apparatus according to claim 1, wherein
an impedance value of the first impedance element and an impedance value of the second impedance element are balanced by taking into account safety and a noise level that needs to be reduced.

9. The common mode noise reduction apparatus according to claim 8, wherein
the impedance value of the second impedance element is determined so as to satisfy a safety condition for specifying requirements concerning the safety, and
the impedance value of the first impedance element is determined, under a condition in which the impedance value of the second impedance element satisfies the safety condition, so as to satisfy a noise condition for specifying requirements concerning the noise level that needs to be reduced.

10. The common mode noise reduction apparatus according to claim 8, wherein,
the impedance value of the first impedance element is determined, under a condition in which the impedance value of the second impedance element satisfies the safety condition, so as to
satisfy a noise condition for specifying requirements concerning the noise level that needs to be reduced and
satisfy a current condition for specifying requirements concerning an allowable upper limit level of a common mode current that flows out to an outside.

11. The common mode noise reduction apparatus according to claim 8, wherein it is given that a parameter concerning the impedance value of the first impedance element is represented as $Z1'$;

the impedance value of the second impedance element is represented as $Z2$;

a value indicating a boundary of a safety condition for specifying requirements concerning the safety is represented as $Z2min$; and a function indicating a boundary of a noise condition for specifying requirements concerning the noise level that needs be reduced is represented as $f(x, y)$, the common mode noise reduction apparatus satisfies $Z2 \geq Z2min$ and $(Z1', Z2) \leq f(x, y)$.

12. The common mode noise reduction apparatus according to claim 11, wherein given a value indicating a boundary of a current condition for specifying requirements concerning an allowable upper limit level of a common mode current that is out flowing is represented as $Z1'min$, the common mode noise reduction apparatus further satisfies $Z1' \geq Z1'min$.

\* \* \* \* \*